United States Patent [19]

Burlett et al.

[11] Patent Number: 5,023,301

[45] Date of Patent: Jun. 11, 1991

[54] POLYPROPYLENE REINFORCED RUBBER

[75] Inventors: Donald J. Burlett, Wadsworth; Richard G. Bauer, Kent; Mellis M. Kelley, Akron, all of Ohio

[73] Assignee: The Goodyear Tire & Rubber Company, Akron, Ohio

[21] Appl. No.: 489,148

[22] Filed: Mar. 5, 1990

[51] Int. Cl.$^5$ ........................ C08L 9/00; C08L 23/12
[52] U.S. Cl. .................................. 525/232; 525/236; 156/394.1
[58] Field of Search ................ 523/351; 525/232, 236; 156/394.1

[56] References Cited

U.S. PATENT DOCUMENTS

| | | | |
|---|---|---|---|
| 3,037,954 | 6/1962 | Gessler et al. | 260/29.8 |
| 4,104,210 | 8/1978 | Coran et al. | 260/4 R |
| 4,130,534 | 12/1978 | Coran et al. | 260/33.6 AQ |
| 4,130,535 | 12/1978 | Coran et al. | 260/33.6 AQ |
| 4,409,365 | 10/1983 | Coran et al. | 525/78 |
| 4,621,119 | 11/1986 | Lu | 525/240 |
| 4,908,253 | 3/1990 | Rasmussen | 428/910 |

FOREIGN PATENT DOCUMENTS

| | | |
|---|---|---|
| 171926 | 7/1985 | European Pat. Off. |
| 60-188412 | 9/1985 | Japan |
| 1408177 | 11/1971 | United Kingdom |

OTHER PUBLICATIONS

Abstract of Japanese Patent 59-4632, Ikeda et al., 1/84.
D. Elliott, NR Technology, vol. 12, Part 3, pp. 59-67 (1981).
D. J. Elliott, Powdered Liquid Thermoplastic Natural Rubber Proc. Symp., 23 (1981).
M. L. Ural'skii et al., Kauch, Rezina, 7 45, (1985).
B. Kuriakose et al., Intern. J. Polymeric Mater., vol. 11, pp. 101–113 (1986).
E. N. Kresge, Polymer Blends, vol. 2, pp. 293–318 (1978).
K. Rauer et al., Res. Discl., 212 436 (1981).
J. E. Stamhuis, Polymer Composites, Aug. 1988, vol. 9, No. 4.
N. M. Matthew et al., J. Nat. Rubb. Res., 1 (4), pp. 240–246 (1986).
CA 104(20):169492p Chemical Abstract (1985).
CA 105(26):228193n Chemical Abstract (1986).

*Primary Examiner*—Allan M. Lieberman
*Attorney, Agent, or Firm*—Bruce J. Hendricks

[57] ABSTRACT

The present invention relates to a process for improving the modulus of a rubber without sacrificing other properties. By utilizing the process of this invention, rubber compositions having increased modulus are prepared by the formation of polypropylene fibrils randomly dispersed throughout the rubber matrix. The present invention includes (1) forming a blend of (a) a polymer alloy containing polypropylene and (b) an unvulcanized rubber stock wherein said polypropylene is present in said blend in an amount ranging from about 5 phr to about 25 phr; and (2) vulcanizing the rubber stock in said blend after orienting said polypropylene by the application of heat and flowing said blend within a mold cavity.

16 Claims, No Drawings

POLYPROPYLENE REINFORCED RUBBER

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in rubber compounds by simply adding higher levels of fillers or curatives.

SUMMARY OF THE INVENTION

The present invention relates to the formation of polypropylene fibrils randomly dispersed through a vulcanized diene containing rubber matrix.

DETAILED DESCRIPTION OF THE INVENTION

There is disclosed a process of forming polypropylene fibrils in a vulcanized diene containing rubber matrix comprising:

(1) forming a blend of (a) a polymer alloy containing polypropylene and (b) an unvulcanized rubber stock wherein said polypropylene is present in said blend in an amount ranging from about 5 phr to about 25 phr; and (2) vulcanizing the rubber stock in said blend after orienting said polypropylene by the application of heat and flowing said blend within a mold cavity.

In addition, there is disclosed a vulcanized rubber matrix having randomly dispersed therein polypropylene fibrils which are formed in-situ by:

(1) forming a blend of (a) a polymer alloy containing polypropylene and (b) an unvulcanized rubber stock, wherein said polypropylene is present in said blend in an amount ranging from about 5 phr to about 25 phr; and (2) vulcanizing the rubber stock in said blend after orienting said polypropylene by the application of heat and flowing said rubber stock within a mold cavity.

For purposes of the present invention, the phrase "polymer alloy containing polypropylene" is a mixture of an unvulcanized diene rubber and from about 5 phr to about 50 phr of finely dispersed polypropylene particles. Preferably, the alloy comprises an unvulcanized diene rubber and from about 25 to about 45 phr of polypropylene. When the amount of polypropylene in the polymer alloy falls below 5 phr, there is insufficient polypropylene to provide the beneficial modulus in the subsequent vulcanized blend (mixture of polymer alloy and rubber stock). When the amount of polypropylene in the polymer alloy exceeds 50 phr, significant difficulties result in processing the blend and achieving the desired distribution of the alloy within the rubber stock. The polymer alloy is prepared by blending a mixture of an unvulcanized diene rubber and polypropylene resin, then masticating the blend at a temperature sufficient to soften or melt the polypropylene resin. It is imperative that there be no vulcanization agents present since one aspect of the present invention is the polymer alloy contain only unvulcanized rubber. Conventional masticating equipment, including Banbury mixers, Brabender mixers or extruders may be used. For example, the temperature may range from about 160° to about 195° C.

The unvulcanized diene rubber in admixture with the polypropylene to form the polymer alloy may vary. The unvulcanized diene rubber typically contains repeat units which are derived from diene monomers, such as conjugated diene monomers and/or nonconjugated diene monomers. Such conjugated and nonconjugated diene monomers typically contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl-1,3-hexadiene, 4,5-diethyl-1,3-octadiene, phenyl-1,3-butadiene and the like. The polydiene rubber can also contain various vinyl aromatic monomers, such as styrene, 1-vinylnaphthalene, 2-vinylnaphthalene, °-methylstyrene, 4-phenylstyrene, 3-methylstyrene, and the like. Some representative examples of diene rubbers that can be used to prepare the alloy include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber and EPDM rubber. The process of this invention is particularly well suited for utilization of polymer alloys containing natural rubber, synthetic polyisoprene and cis-1,4-polybutadiene.

The polypropylene used as a component of the polymer alloy is a crystalline, high molecular weight polymer which is derived from the polymerization of propylene monomer through the use of catalyst systems. Its crystallinity is due to the stereospecific arrangement of the polymer molecule and imparts well known strength and durability properties. The most common polypropylene is isotactic polypropylene, in which the molecular structure is arranged with the methyl groups aligned on the same side of the polymer chain. Various methods of manufacture of polypropylene are well known to those skilled in the art. The melting temperature of polypropylene is approximately 168° C. and its softening point (Vicat softening point) is approximately about 151° C. Polypropylene which may be used to prepare the polymer alloy are commercially available from a number of manufacturers including General Polymers Division of Ashland Chemical Company, Columbus, Ohio, Shuman Plastics of Buffalo, New York and Eastman Chemical Products, Inc., Plastics Division, Rochester, N.Y. Polypropylene is commercially available in ⅛ inch pellets which is suitable for use in the present invention.

In a preferred embodiment of the present invention, a compatibilizer is used in the polymer alloy. The compatibilizer is used in an amount sufficient to form a grafted polypropylene-diene copolymer which will act as an interfacial agent to facilitate the dispersion of the polypropylene in the polydiene matrix. However, the compatibilizer should not be used in an amount so as to grossly crosslink the diene matrix causing processing problems. Examples of suitable compatibilizing agents include peroxides and bismaleimides. The level of compatibilizer and in particular phenylene bismaleimide may vary. For example, it may range from about 0.01 to about 2.0 phr in the alloy. Preferably, the compatibilizer is present in an amount of from about 0.25 phr to about 0.75 phr.

In one aspect of the present invention, conventional amounts of an antidegradant are added to the polymer alloy in order to protect the diene rubber during processing. The antidegradant may be selected from any of a number of commercially available antidegradants including monophenols, bisphenols, thiobisphenols, polyphenols, hydroquinone derivatives, phosphites and blends thereof, thioesters, naphthylamines, diphenylamines, para-phenylenediamines, quinolines and the like. Generally speaking these antidegradants are used in an amount ranging from about 0.1 phr to about 10 phr. Preferably a combination of para-phenylenediamine type and monophenolic type antioxidant is used in an amount ranging from about 0.25 phr each to about 0.75 phr each.

The polymer alloy containing the polypropylene is added to an unvulcanized rubber stock to form a blend in an amount sufficient so that the total amount of polypropylene in the blend ranges from about 5 phr to about 25 phr. The phr of polypropylene is based on the total amount of rubber in the blend including the alloy and unvulcanized rubber stock. Preferably, the total amount of polypropylene in the blend ranges from about 10 to about 20 phr.

The rubber stock is predominantly a diene rubber. Suitable examples of such rubbers or blends thereof are listed for use in the polymer alloy. In a particularly preferred mode, the same diene rubber is used in the alloy that is used in the rubber stock in order to provide inherent compatibility of the diene rubbers in the blend.

In addition to the diene rubber, the rubber stock may contain conventional additives including fillers, pigments, zinc oxide, stearic acid, accelerators, sulfur vulcanizing agents, stabilizers, antidegradants, processing oils, tackifiers, plasticizers, waxes, prevulcanization inhibitors, extender oils and the like. Representative of suitable fillers including carbon black, silica, titanium dioxide and clay which are typically added in amounts ranging from 25 to about 125 phr depending on the application of the stock. Representative of conventional accelerators are amines, guanidines, thioureas, thiazoles, thiurams, sulfenamides, dithiocarbamates and xanthates which are typically added in amounts of from about 0.2 to about 5 phr. Representative of sulfur vulcanizing agents include elemental sulfur (free sulfur) or sulfur donating vulcanizing agents, for example, an amine disulfide, polymeric polysulfide or sulfur olefin adducts. The amount of the sulfur vulcanizing agent will vary depending on the type of rubber and particular type of sulfur vulcanizing agent but generally range from about 0.1 phr to about 5 phr with a range of from about 0.5 to about 2 being preferred. Representative of the antidegradants which may be in the rubber stock include monophenols, bisphenols, thiobisphenols, polyphenols, hydroquinone derivatives, phosphites, phosphate blends, thioesters, napthylamines, diphenylamines as well as other diarylamine derivatives, para-phenylenediamines, quinolines and blended amines. Antidegradants are generally used in an amount ranging from about 0.10 phr to about 10 phr. Representative of processing oils which may be used in the rubber stock include activated dithio-bisbenzanilide, poly-para-dinitrosobenzene, xylyl mercaptans, aliphatic-naphthenic-aromatic resins, polyethylene glycol, petroleum oils, ester plasticizers, vulcanized vegetable oils, pine tar, phenolic resins, petroleum resins, polymeric esters and rosins. These processing oils may be used in conventional amounts ranging from about 0 to about 30 phr.

The blend of rubber stock and polymer alloy may be used to form a number of composites including tires, belts or hoses. Preferably, the composite is a tire.

As known to those skilled in the art, a tire is a composite of several components, each serving a specific and unique function yet all synergistically functioning to produce the desired performance. Tire components are made from rubber stocks and cords (textile, fiberglass, and steel wire). It is in the rubber stock that the process of the present invention is of particular importance. The components of a tire that the present process is of importance include the tread base, tread cap, carcass, cushion, overlay, belt, shoulder wedge, bead, apex and chafer.

The blend of polymer alloy containing polypropylene may be used as part of the rubber stock in one or more of the components of a composite. For example, when the composite is a tire, a green tire is prepared using the blend of rubber stock and polymer alloy containing polypropylene. As known to those skilled in the art, a green tire is generally built from the inside out on a steel or an inflated rubber drum. The interliner is first wrapped tightly around the drum. A fabric toe guard is wound at each end of the interliner. The plies, precut to required width, are wrapped over the liner. The beads are offered near the ends of the plies, the apex is wrapped over the bead, and the plies are turned up and back to wrap around the bead construction. A shoulder wedge strip is positioned on the plies and bead turn up and the chafer is wrapped over the bead construction. A chafer cover strip is applied over the bead area. Sidewall strips are wrapped to overlay both the shoulder wedge and the chafer cover strip. The belts are then positioned to just contact the sidewall. The nylon overlay is wrapped directly over the belts and the extruded tread compound is wrapped over the belt area. For tires with white sidewalls, that strip and a cover strip are wrapped in position. The building drum is then collapsed, permitting the green tire to be removed as an elongated cylinder.

After the unvulcanized composite has been formed containing at least one component comprising the blend of polymer alloy and rubber stock, the rubber stock is vulcanized after the polypropylene is oriented by the application of heat and flowing the rubber stock within a mold cavity. In the instance where the composite is a green tire, the green tire is inserted into a tire mold press and a tire cure bladder is positioned inside of the green tire. The tire cure bladder is attached to an internal portion of the tire press. The tire mold is closed and the tire cure bladder is expanded by internal, heated fluid outwardly against the inner surface of the green tire to press the tire outward under conditions of heat and pressure to shape and cure the time. In the automatic curing presses most widely used, such as the Bag-O-Matic press, a continuous temperature is maintained by steam in the shell around the tire curing mold. Heat and pressure are supplied internally in cycles of steam, air, or superheated water through the bladder of heat-resistant rubber. The cylindrical green tire is placed over the bladder as the press closes, steam enters the bladder and the tire is expanded by the downward pressure of the mold plus the outward thrust of the bladder. When the press is completely closed, the tread and sidewall is forced into the pattern of the mold by high pressure in the bladder before vulcanization. The vulcanization is generally carried out at temperatures of between about 140° C. and 200° C. Preferably, the vulcanization is conducted at temperatures ranging from about 145° C. to 180° C.

Whereas, one embodiment has been described with respect to a green tire, it is contemplated herein that other conventional vulcanization processes may be used to induce the formation of polypropylene fibrils in a rubber matrix, such as an injection molding process or compression molding process. Once again, the key to the present invention is that the temperature be sufficient to soften or melt the polypropylene in the alloy while simultaneously flowing the blend within a mold to orient the polypropylene into fibrils and vulcanize the rubber in the blend.

EXAMPLE 1

Preparation of Polypropylene/Polyisoprene Alloy 168 grams of polyisoprene was placed in a 250 ml electrically heated Brabender mixer. While mixing at 70 rpm, 1.25 grams of phenothiazine, 1.25 grams of phenylene bis-maleimide, and 72 grams of polypropylene were added to the Brabender. The polypropylene was in the form of ⅛ inch pellets and was purchased from General Polymers Division of Ashland Chemical Company under the designation 5520. The material was allowed to mix for 5 minutes at 195° C. The polymer alloy was then dumped and collected. The alloy had polypropylene domains in the 2-5 micron range.

EXAMPLE 2

A rubber blend containing the polymer alloy of Example 1 and a conventional rubber stock was prepared in a Brabender mixer using two separate stages of addition. The Brabender mixer was operated at 55 rpm. The components of the first stage were 65 parts of polyisoprene, 50 parts of the alloy of Example 1 and conventional amounts of carbon black, antioxidant, wax and stearic acid. The resulting blend contained 15 phr of polypropylene. After mixing for 5 minutes, the dump temperature of the blend was 180° C. Two samples of this mixture were taken (Sample 1 and 2). Sample 1 was not milled; however, Sample 2 was milled into tensile sheets (2.5 mm thick). To the remaining mixture was added the second stage components. The second stage components were conventional amounts of zinc oxide, sulfur, primary accelerator and secondary accelerator. After mixing for 2 minutes, the dump temperature of the blend was 100° C. A sample of the blend was taken (Sample 3). The remaining blend containing the polymer alloy, first and second stage, was cured at 150° C. The cured samples were prepared by placing 6.2 grams of the compounded stock in a 1¼ inch×3¼ inch×1/16 inch cure mold cavity and press curing the sample at 150° C. under 280 psi pressure. The samples were cured to t90. After curing the fourth sample was taken (Sample 4).

Observation of the four samples showed a dramatic contrast. Sample 1 (unmilled mixture of Stage 1 and polymer alloy) showed little elongation and orientation of the polypropylene particles which ranged from 0.2 to 2 microns. Sample 2 (milled mixture of Stage 1 and polymer alloy) was similar to Sample 1 with no significant change in morphology being observed. Sample 3 showed no significant change in morphology when compared to Samples 1 and 2. Sample 4 was significantly different as the polypropylene was drawn out into fibrils having a very high ratio of length vs. diameter (L/D ratio) which were much more pronounced than Samples 1-3. The fibrils in Sample 4 were reasonably oriented and had lengths of from about 10 to 15 microns and diameters of from about 0.05 to 0.1 microns. The L/D ratio ranged from about 100 to 300.

EXAMPLE 3

To the first stage rubber stock (in the absence of polymer alloy) used in Example 2 was mixed 15 phr of polypropylene. The stock was mixed for the same length of time as Example 2 and to the same dump temperature as the stock containing the polypropylene alloy. Standard mixing conditions were used during this mixing. Dispersion in the first stage rubber stock after mixing was very poor as evidenced by visual detection of sizable pieces (32-64 mm) of undispersed polypropylene. Subsequent mixing with the components of stage 2 did not significantly improve the dispersion of the polypropylene in the rubber stock.

EXAMPLE 4

A rubber blend containing the polymer alloy of Example 1 and a rubber stock was prepared in a Brabender mixer using two stages of addition. The rubber stock was one characteristic of those used in the apex of a tire. For the purposes of comparison, the same rubber stock was prepared in the absence of the polymer alloy. The Brabender mixer was operated at 55 rpm. The components of the first stage were 42 parts natural rubber, 83 parts of the alloy of Example 1 (to yield 25 phr polypropylene in blend) and conventional amounts of zinc oxide, carbon black, silica, oil, antioxidant, antiozonant and stearic acid. After mixing for 4 minutes, the temperature of the mixture was 170° C. Next, the second stage reactants were added. The second stage reactants were conventional amounts of silica and silica coupler. The stock was mixed for 2 minutes. The blend was compression molded as was the control at 150° C. to its t90 value.

Table I below lists the physical properties of the control versus the same rubber stock with the addition of a polypropylene fiber produced by the process of the invention. As can be seen from Table I, formation of polypropylene fibers results in significantly increased tension and compression modulus and hardness, maintenance of rebound and cure properties and drop in ultimate tensile and elongation.

TABLE I

| Sample | Control | Present Invention |
| --- | --- | --- |
| Rheometer @ 150° C. | | |
| Min. Torque (dN-m) | 10.9 | 15.9 |
| Max. Torque (dN-m) | 81.60 | 81.9 |
| T$_{25}$ (min.) | 6.60 | 6.10 |
| T$_{90}$ (min.) | 17.2 | 16.4 |
| Tensile Properties | | |
| 100% Elongation (MPa) | 5.4 | 13.0 |
| Max. Elongation (MPa) | 335 | 100 |
| Break Strength (MPa) | 17.7 | 13.0 |
| Hardness (Shore A) | | |

TABLE I-continued

| Sample | Control | Present Invention |
|---|---|---|
| Room Temperature | 87.5 | 94.1 |
| 100° C. | 82.6 | 88.5 |
| Rebound | | |
| Room Temperature (%) | 41.3 | 39.1 |
| 100° C. (%) | 52.2 | 50.5 |
| Compression Modulus @ % Compression | | |
| 15% (lbs. load) | 74 | 145 |
| 30% (lbs. load) | 125 | 250 |

What is claimed is:

1. A process of forming polypropylene fibrils in a vulcanized diene containing rubber matrix comprising:
   (1) forming a polymer alloy containing polypropylene by mixing at a temperature ranging from about 160° to 195° C. an unvulcanized diene rubber and polypropylene;
   (2) forming a blend of (a) said polymer alloy containing polypropylene, (b) an unvulcanized rubber stock wherein said polypropylene is present in said blend in an amount ranging from about 5 phr to about 25 phr; and
   (3) vulcanizing the rubber stock in said blend after orienting said polypropylene by the application of heat and flowing said rubber stock within a mold cavity wherein the vulcanization is conducted at a temperature ranging from about 140° C. to 200° C.

2. The process of claim 1 wherein said polymer alloy comprises a diene containing rubber and from about 5 phr to about 50 phr of polypropylene.

3. The process of claim 1 wherein said blend is in the form of a component of a green tire having elements which are to be its outer tread for ground contacting purposes, two spared inextensible beads, sidewalls extending radically outward from said beads to join said tread, supporting carcass with reinforcing elements, and an inner surface of rubber green stock.

4. The process of claim 3 wherein said green tire is inserted into a tire mold press and a tire cure bladder is positioned inside of said green tire, said bladder being attached to an internal portion of said tire press.

5. The process of claim 4 wherein said vulcanization of rubber stock and orientation of said polypropylene is by closing the tire mold cavity and expanding said tire cure bladder by internal, heated fluid outwardly against the inner green stock surface of said tire to press the tire outward under conditions of heat and pressure to shape and cure said tire.

6. The process of claim 1 wherein said polypropylene is present in said blend in an amount ranging from about 10 to about 20 phr.

7. The process of claim 2 wherein said diene containing rubber is selected from the group consisting of polybutadiene, styrene-butadiene rubber, synthetic polyisoprene, natural rubber, isoprene-butadiene rubber, isoprene-butadiene-styrene rubber, nitrile rubber, carboxylated nitrile rubber and EPDM rubber.

8. The process of claim 2 wherein the diene rubber in said unvulcanized rubber stock is selected from the group consisting of polybutadiene, styrene-butadiene rubber, synthetic polyisoprene, natural rubber, isoprene-butadiene rubber, isoprene-butadiene-styrene rubber, nitrile rubber, carboxylated nitrile rubber and EPDM rubber.

9. A vulcanized rubber matrix comprising a vulcanized diene containing rubber having randomly dispersed therein polypropylene fibrils which are formed in-situ by:
   (1) forming a polymer alloy containing polypropylene by mixing at a temperature ranging from about 160° to 195° C. an unvulcanized diene rubber and polypropylene;
   (2) forming a blend of (a) said polymer alloy containing polypropylene, and (b) an unvulcanized diene rubber stock wherein said polypropylene is present in said blend in an amount ranging from about 5 phr to about 25 phr: and
   (3) vulcanizing the rubber stock in said blend after orienting said polypropylene by the application of heat and flowing said rubber stock within a mold cavity wherein said vulcanization is conducted at a temperature ranging from about 140° to 200° C.

10. The vulcanized rubber matrix of claim 9 wherein said polymer alloy comprises a diene containing rubber and from about 5 phr to about 50 phr of polypropylene.

11. The vulcanized rubber matrix of claim 9 wherein said blend is in the form of a component of a green tire having elements which are to be its outer tread for ground contacting purposes, two spared inextensible beads, sidewalls extending radically outward from said beads to join said tread, supporting carcass with reinforcing elements, and an inner surface of rubber green stock.

12. The vulcanized rubber matrix of claim 11 wherein said green tire is inserted into a tire mold press and a tire cure bladder is positioned inside of said green tire, said bladder being attached to an internal portion of said tire press.

13. The vulcanized rubber matrix of claim 12 wherein said vulcanization of rubber stock and orientation of said polypropylene is by closing the tire mold cavity and expanding said tire cure bladder by internal, heated fluid outwardly against the inner green stock surface of said tire to press the tire outward under conditions of heat and pressure to shape and cure said tire.

14. The vulcanized rubber matrix of claim 9 wherein said polypropylene is present in said blend in an amount ranging from about 10 to about 20 phr.

15. The vulcanized matrix of claim 10 wherein said diene containing rubber is selected from the group consisting of polybutadiene, styrene-butadiene rubber, synthetic polyisoprene, natural rubber, isoprene-butadiene rubber, isoprene-butadiene-styrene rubber, nitrile rubber, carboxylated nitrile rubber and EPDM rubber.

16. The vulcanized matrix of claim 9 wherein the diene containing rubber in said unvulcanized rubber stock is selected from the group consisting of polybutadiene, styrene-butadiene rubber, synthetic polyisoprene, natural rubber, isoprene-butadiene rubber, isoprene-butadiene-styrene rubber, nitrile rubber, carboxylated nitrile rubber and EPDM rubber.

* * * * *